(12) United States Patent
Girard (10) Patent No.: US 8,201,313 B1
(45) Date of Patent: Jun. 19, 2012

(54) DEVICE AND PROCESS FOR ALIGNING A CARRIER ROLL TO THE TIRE OF A ROTATING VESSEL

(75) Inventor: Anthony D. Girard, Louisville, KY (US)

(73) Assignee: Industrial Process Systems, Inc., Louisville, KY (US)

( * ) Notice: Subject to any disclaimer, the term of this patent is extended or adjusted under 35 U.S.C. 154(b) by 468 days.

(21) Appl. No.: 12/566,044

(22) Filed: Sep. 24, 2009

(51) Int. Cl.
*B23Q 17/00* (2006.01)
*B23P 19/00* (2006.01)

(52) U.S. Cl. ...................................... 29/407.09; 29/759

(58) Field of Classification Search ............... 29/407.09, 29/407.1, 407.05, 464, 466, 467, 468, 719, 29/759, 271
See application file for complete search history.

(56) References Cited

U.S. PATENT DOCUMENTS

| | | | | |
|---|---|---|---|---|
| 4,256,503 A | * | 3/1981 | Tsuda et al. | 106/745 |
| 7,946,554 B2 | * | 5/2011 | Sassatelli et al. | 248/580 |

* cited by examiner

*Primary Examiner* — John C Hong
(74) *Attorney, Agent, or Firm* — Camoriano and Associates; Theresa Fritz Camoriano

(57) ABSTRACT

A device and method for aligning a carrier roll to a riding ring on a rotating piece of equipment by checking the degree to which a plane on the face of the carrier roll is parallel to a plane on the face of the riding ring.

10 Claims, 8 Drawing Sheets

DEVICE AND PROCESS FOR ALIGNING A CARRIER ROLL TO THE TIRE OF A ROTATING VESSEL

BACKGROUND

The present invention relates to a device and method for aligning a carrier roll (also referred to as a trunnion), to a riding ring (also referred to as a pathring or tire), of a rotating vessel.

Rotary equipment, such as rotary kilns and horizontal dryers, typically drive the rotation of the vessel using a pinion gear which drives a ring gear that is secured to the outside of the body of the vessel. The vessel is supported for rotation by means of a plurality of riding rings (pathrings or tires), which are secured to the outside of the body of the vessel and ride on carrier rolls (trunnions). Each carrier roll is supported for rotation on a foundation by means of bearings. Each riding ring typically is supported on two carrier rolls, located at approximately the 5:00 and 7:00 positions of the riding ring. As the vessel is rotated by the drive mechanism, each riding ring, which is fixed to the vessel, also rotates, supported on its respective carrier rolls, which are caused to rotate by the rotation of the riding ring.

The axis of rotation of each of the carrier rolls should be substantially parallel to the axis of rotation of the vessel. If there is a substantial misalignment between the axis of rotation of one or more of the carrier rolls relative to the axis of rotation of the vessel and its riding ring, operational problems, such as excessive vibration and/or uneven wear of the carrier roll or of the riding ring may occur.

SUMMARY

One embodiment of the present invention provides a method and a device for aligning the axis of rotation of each of the carrier rolls with the axis of rotation of the vessel. Each carrier roll has at least one face which is perpendicular to the axis of rotation of that carrier roll, and each riding ring has at least one face which is perpendicular to the axis of rotation of the riding ring (which is also the axis of rotation of the vessel). Thus, if the planar face of the carrier roll is brought into alignment so it is parallel to the planar face of the riding ring on which it is supported, then the axis of rotation of the carrier roll will be parallel to the axis of rotation of the riding ring (and of the vessel).

DESCRIPTION

Figures 1, 2, 3:
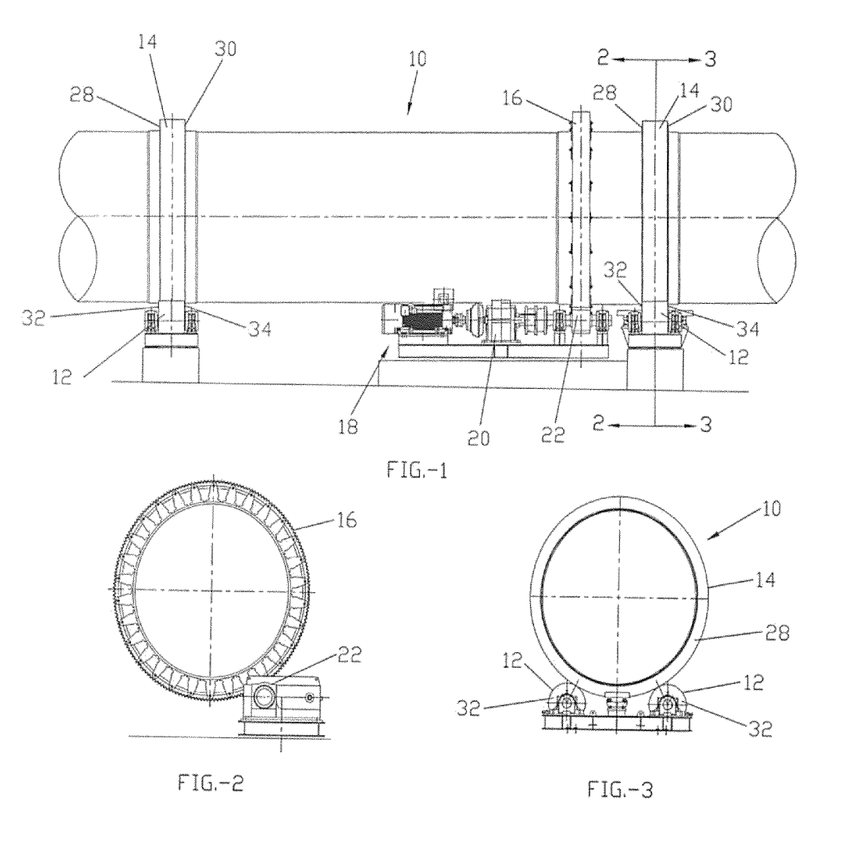
FIG. 1 is a partially broken-away side view of a typical horizontal kiln.
FIG. 2 is a view along line 2-2 of FIG. 1.
FIG. 3 is a view along line 3-3 of FIG. 1.

FIG. 1 shows a partially broken away rotary kiln 10 rotatably supported on two sets of paired carrier rolls 12 (See also FIG. 3). The kiln 10 includes two riding rings 14 fixedly secured to the kiln 10 such that they rotate with the kiln 10. Each riding ring 14 rides on a pair of carrier rolls 12 as shown in FIG. 3. The kiln 10 also includes a ring gear 16 fixedly secured to the kiln 10. A drive mechanism for rotating the kiln 10 includes a drive motor 18, a gear reducer 20, and a pinion gear 22, which meshes with the ring gear 16 to rotate the kiln 10.

Figure 1A:
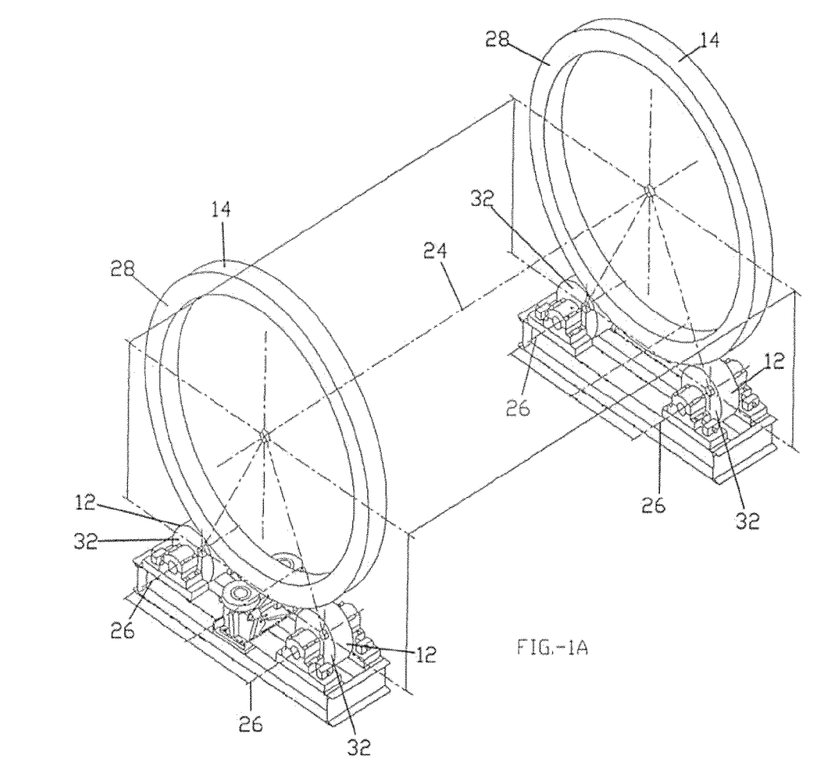
FIG. 1A is a schematic view of the riding rings and carrier rolls of the kiln of FIG. 1.

FIG. 1A is a schematic view of the riding rings 14 and carrier rolls 12 of the kiln of FIG. 1 looking at the riding rings 14 and carrier rolls 12 from the upstream side.

As can be seen from FIGS. 1 and 1A, each riding ring 14 defines an upstream shoulder or face 28 and a downstream shoulder or face 30. At least one of these two faces 28, 30 lies on a plane which is perpendicular to the axis of rotation of the riding rings 24, which is also the axis of rotation of the kiln 10.

Each carrier roll 12 also defines an upstream face 32 and a downstream face 34. At least one of these two faces 32, 34 lies on a plane which is perpendicular to the axis of rotation of the carrier roll 26.

For the purposes of the discussion below, it is assumed that each carrier roll 12 is properly aligned with its respective riding ring 14 when the axis of rotation 26 of the carrier roll 12 is aligned with the axis of rotation 24 of its respective riding ring 14 (which is also the axis of rotation of the kiln 10). This also means that, when properly aligned, at least one of the upstream and downstream faces 28, 30 of the riding ring lies on a plane which is parallel to at least one of the upstream and downstream faces 32, 34 of its corresponding carrier roll 12. The alignment tool 36 (See FIGS. 4-9) makes use of this parallel-planes relationship to measure the degree of alignment of the carrier rolls 12 to their respective riding rings 14, as explained in more detail below.

It should be noted that some small amount of misalignment between the planar faces of the carrier roll 12 and the riding ring 14 (and between the axes of rotation of the carrier roll 12 and the riding ring 14) may be permitted or even desired, and that the alignment tool 36 can be used to measure the amount of misalignment and to bring the surfaces and axes into the desired alignment specifications.

Referring now to FIGS. 4-12, the alignment tool 36 includes an elongated yoke 38 with first and second ends 40, 42. Mounting brackets 44 are bolted onto each end 40, 42 of the yoke 38 using the screws 46. As best appreciated in FIG. 9, each of the mounting brackets 44 defines a window opening 48. Each bracket 44 also defines upper and lower rows of openings 52, and respective mounting screws 46 extend through one of the upper openings 52 and one of the lower openings 52 and into a respective threaded hole in the yoke 38 to secure the mounting bracket 44 to its respective end 40, 42 of the yoke 38.

Figure 6:
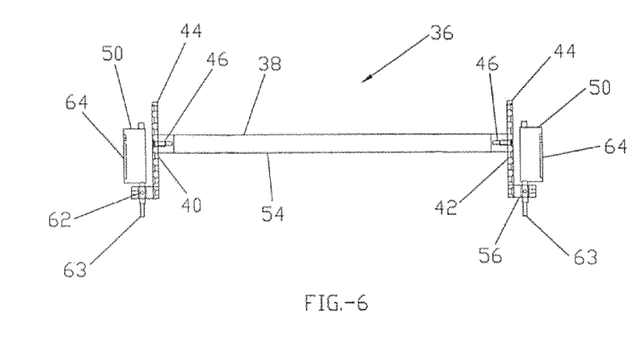
FIG. 6 is a plan view of the alignment tool of FIG. 5.
Figure 7:
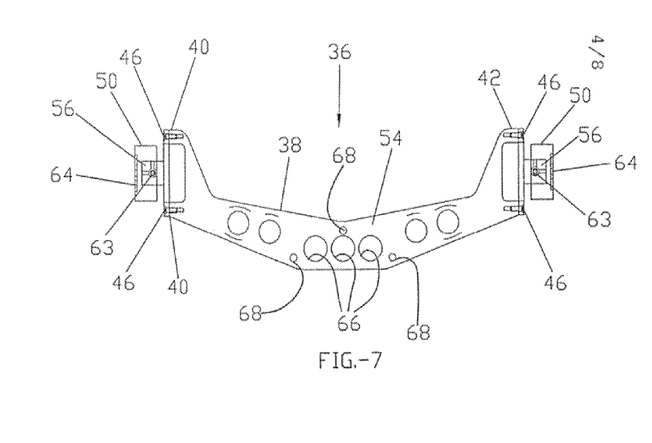
FIG. 7 is a side view of the alignment tool of FIG. 5.
Figure 8:
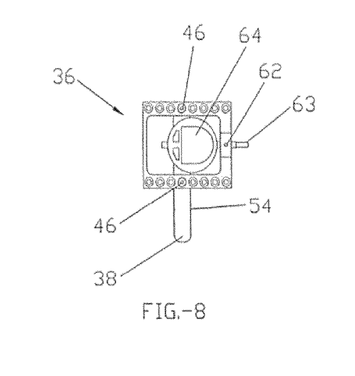
FIG. 8 is an end view of the alignment tool of FIG. 5.

The yoke 38 includes a substantially planar main face 54 extending between the first and second ends 40, 42 of the yoke 38. The mounting brackets 44 are mounted at right angles to this plane, and the openings 52 allow the mounting brackets 44 to be adjustably secured in or out relative to the main face 54 of the yoke 38. Usually, the mounting brackets 44 are mounted to their respective ends 40, 42 so they each project the same distance from the planar main face 54 of the yoke 38, as depicted in FIG. 6. Each mounting bracket 44 also defines a tab 56 projecting outwardly at a right angle to the main portion of the mounting bracket, and each tab 56 in turn defines a through opening 58 to receive the shaft 60 of the measurement device 50.

A distance measurement device 50 is mounted to each mounting bracket 44 by inserting the shaft 60 of the measurement device 50 through the opening 58 in its corresponding mounting bracket 44. The shaft 60 is then retained and fixed in position on its respective mounting bracket 44 via setscrews 62 (See FIGS. 6 and 8), which extend into the top and end of each tab 56 and into the opening 58 which receives the shaft 60. The measurement devices 50 may be analog or digital indicators, and they include a probe 63 intended to contact the surface to be measured and a dial or screen 64 used to read the results of the measurement. The measurement device 50 may be rotated about the axis of the shaft 60 (with the window 48 in the mounting bracket 44 providing room for the head of the measurement device to rotate) so that the readout face 64 of the measurement device faces in any desired direction, including upwardly, inwardly, outwardly, and downwardly, for ease of reading the display on the readout face 64. If the readout face 64 faces inwardly, it would be viewed by looking through the window 48.

Figure 4:
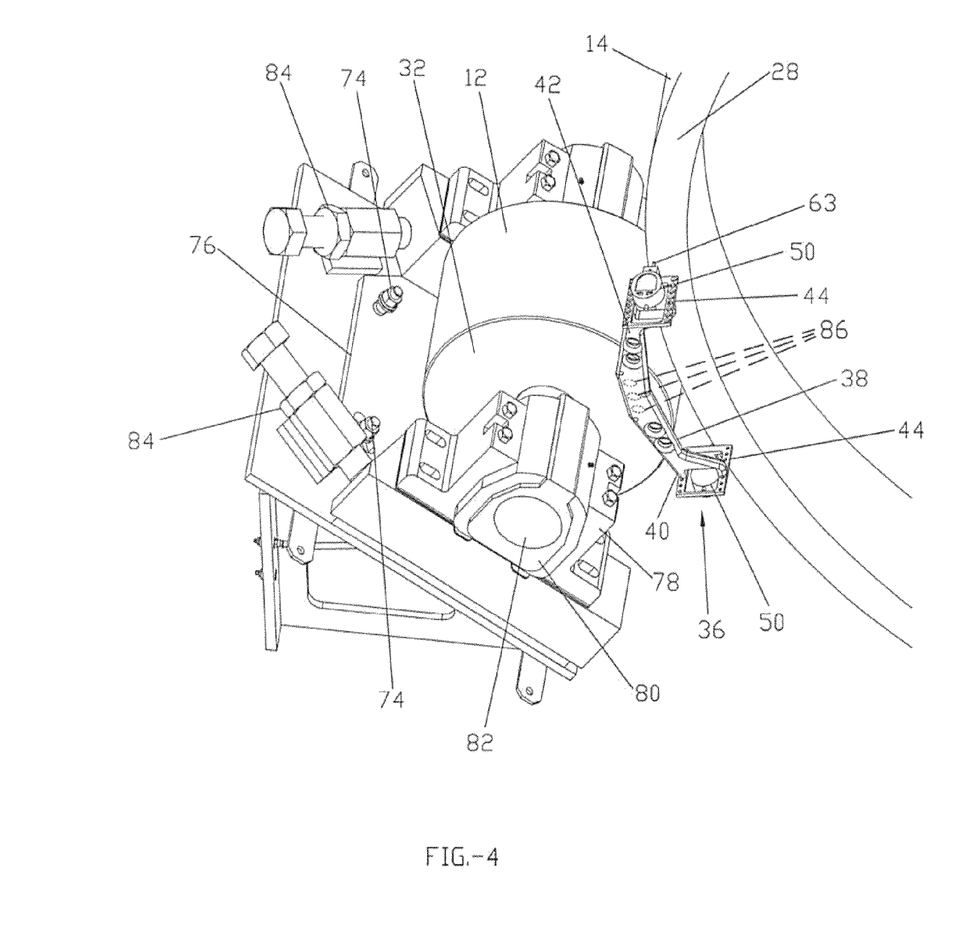
FIG. 4 is a partially broken-away, perspective view of one of the carrier rolls of FIG. 3, with an alignment tool made in accordance with the present invention mounted on the carrier roll.
Figure 5:
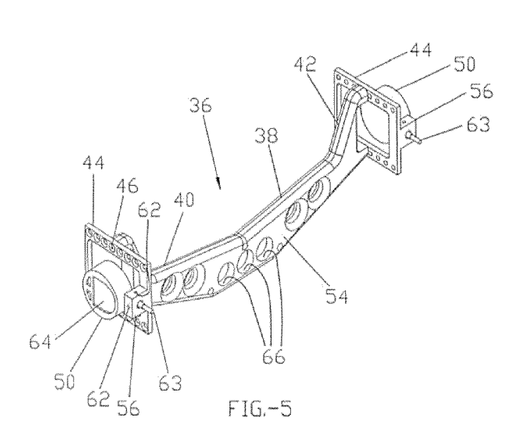
FIG. 5 is a perspective view of the alignment tool of FIG. 4.
Figure 11:
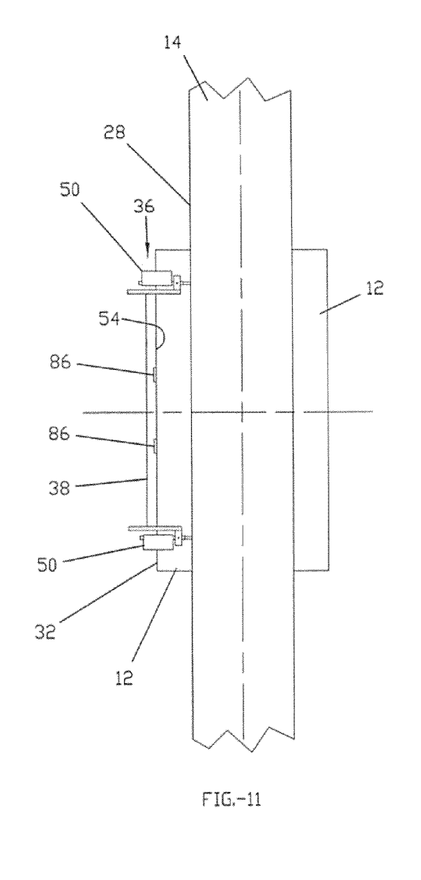
FIG. 11 is similar to FIG. 10 but with the misalignment between the carrier roll and the riding ring having been corrected.
Figure 12:
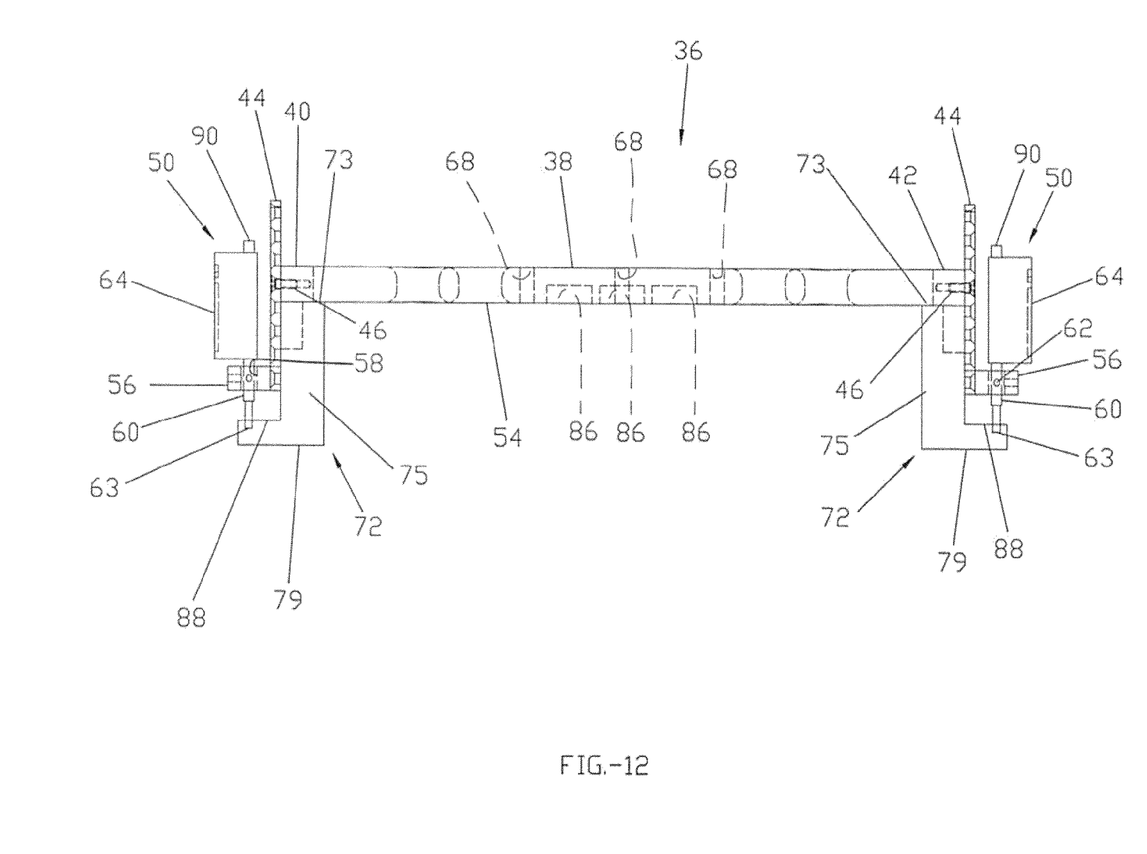
FIG. 12 is a plan view similar to FIG. 6 but showing the use of gauge blocks to calibrate the measurement devices of the alignment tool.

Referring to FIGS. 5-9, the planar main face 54 of the yoke 38 has been carefully machined to within 2 thousands of an inch (+ or –0.002") of true flat from one end 40 of the yoke 38 to the other end 42. The yoke 38 defines a plurality of openings 66 extending through and perpendicular to the planar main face 54. These openings 66 house magnets 86, which are secured to the hoke 38 and are recessed from the planar main face 54 of the yoke 38. These recessed magnets 86 are used to releasably secure the alignment tool 36 to a respective face 32 or 34 of a carrier roll 12, as shown in FIGS. 4, 11, and 12. Of course, alternative means could be used to secure the alignment tool 36 to a face 32 or 34 of a carrier roll 12, such as tying or strapping the alignment tool 36 to the carrier roll 12, if desired. In this embodiment, the magnets 86 are bonded to the inside of the openings 66 using a product called J-B weld, made by the J-B Weld Company of Sulphur Springs, Tex., USA.

Figure 9:
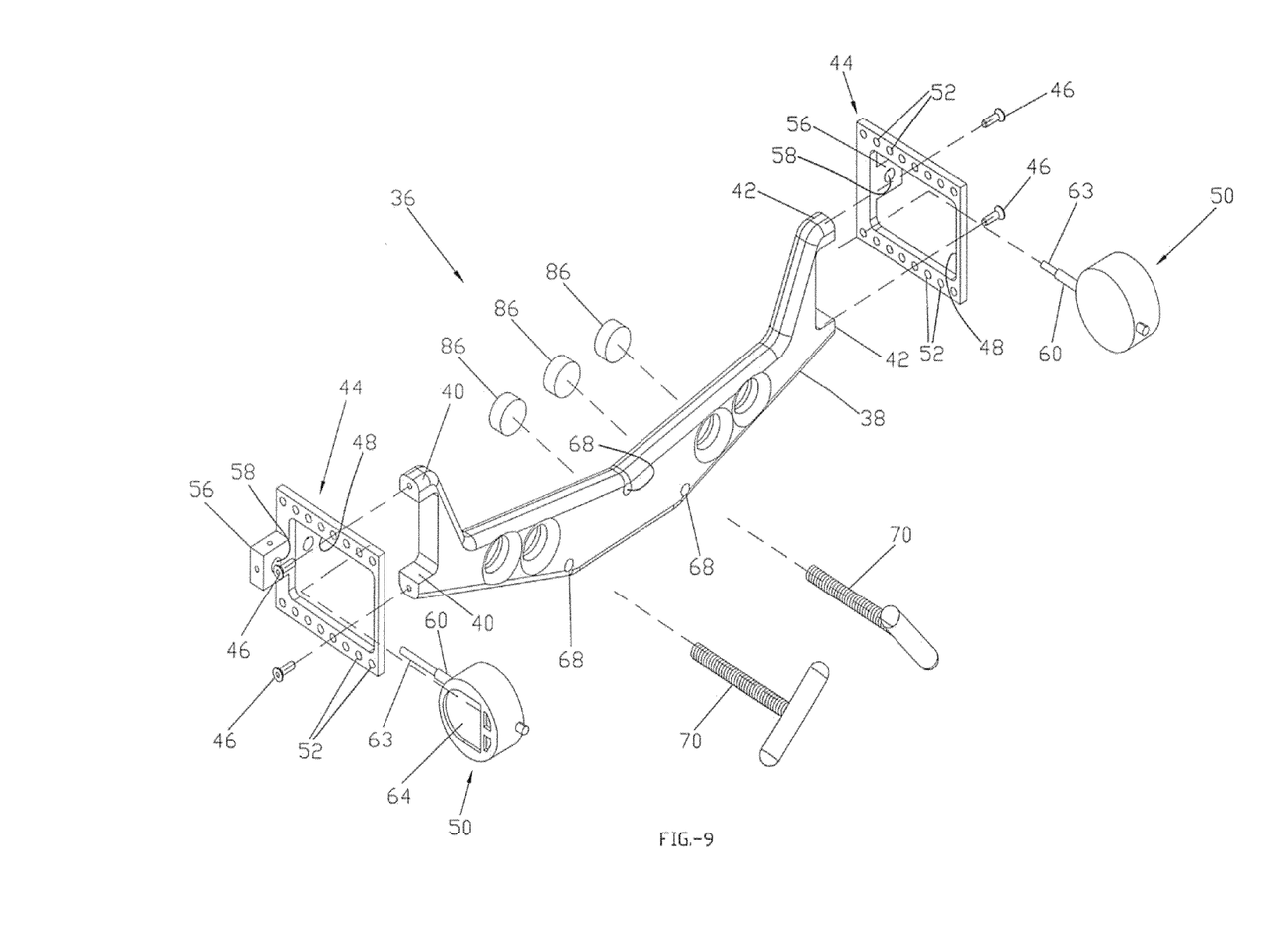
FIG. 9 is an exploded perspective view of the alignment tool of FIG. 5, including jacking screws to remove the tool.

The yoke 38 also defines a plurality of threaded through-openings 68 which receive T-handled jacking screws 70 to assist in the removal of the alignment tool 36 from the carrier roll 12. By threading the jacking screws 70 through their respective threaded through-openings 68, the ends of the jacking screws 70 push against the face of the carrier roll 12 to separate the alignment tool 36 from the face of the carrier roll 12 until the magnetic attraction between the alignment tool 36 and the carrier roll 12 is sufficiently reduced that the alignment tool 36 may be safely and readily removed.

Figure 13:
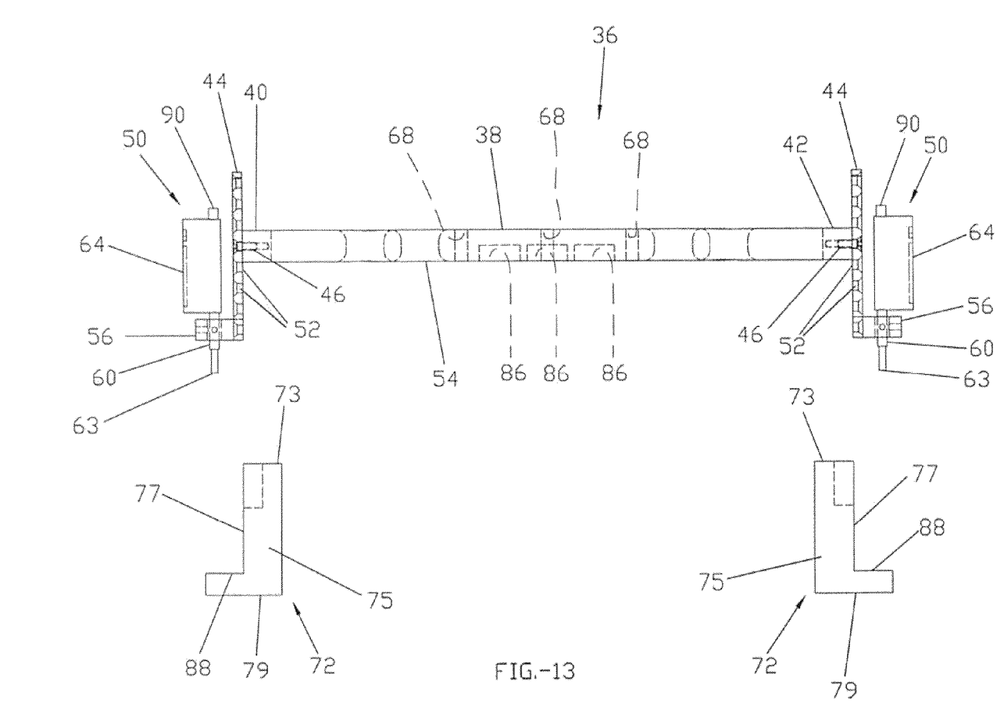
FIG. 13 is a partially exploded view of the alignment tool and the gauge blocks of FIG. 12.

FIGS. 12 and 13 depict the alignment tool 36 with "L" shaped gauge blocks 72 being used for accurately calibrating the measurement devices 50 to zero reference (also referred to as zeroing) the measurement devices 50. As best appreciated in FIG. 12, a first planar face 73 of one leg 75 of the L-shaped gauge block 72 is snugged up against the planar main face 54 of the yoke 38, with a second planar face 77 of the one leg 75 at right angles to the first planar face 73 lying against its respective mounting bracket 44, and the other leg 79 of the gauge block 72, having a planar face 88 that is parallel to the planar main face 54, pushes against and depresses the spring-biased probe 63 of the corresponding measurement device 50. Pressing a button 90 on the measurement device 50 zeroes the measurement device 50 at this reference position. While two gauge blocks 72 are shown in FIG. 12, one for each measurement device 50, in practice a single gauge block 72 may be used, first zeroing one of the measurement devices 50 and then zeroing the second one. The use of the gauge block 72 ensures that each measurement device 50 is accurately zeroed to the same reference distance (measured outwardly from the plane defined by the accurately machined, planar main surface 54 of the yoke 38 to the tip of the probe 63 of the measurement device 50), and that this reference distance is set to zero on the measurement devices 50.

The actual readings by the measurement devices 50 when carrying out the calibration procedure described below are not critical. What is important is the difference in the actual readings between the two measurement devices 50. If the difference between the actual readings is zero (that is, if the actual readings are identical), then the axis of rotation 26 of the carrier roll 12 is aligned with the axis of rotation 24 of the riding ring 14. In practice, a technician will adjust the position of the carrier roll 12 to obtain measurements on the two measurement devices 50 which differ by a figure which is within the acceptable specification or tolerance range 50.

Operation of the Alignment Tool

Figure 10:
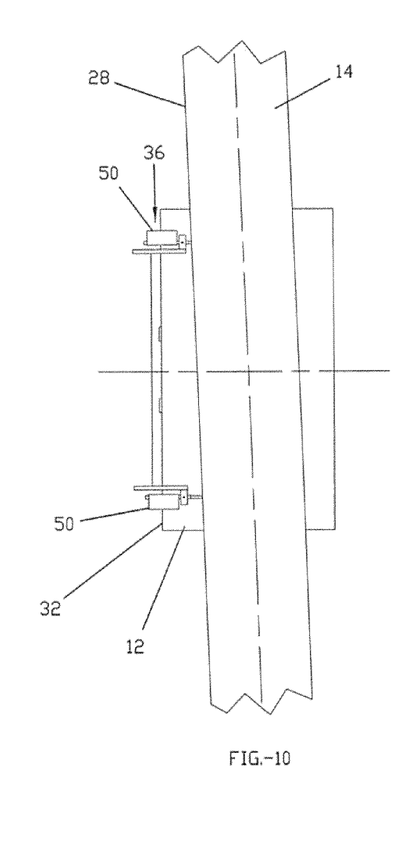
FIG. 10 is a partially broken-away, enlarged plan view of the alignment device mounted on the carrier roll and showing some degree of misalignment between the carrier roll and the riding ring.

Referring to FIGS. 4, 10, and 11, to use the alignment tool 36, the yoke 38 (without the mounting brackets 44 and the measurement devices 50) is first mounted onto the face 32 of a carrier roll 12. The mounting brackets 44, with the measurement devices 50 attached, are then held up to the ends 40, 42 of the yoke 38 in order to estimate the most advantageous placement of the mounting brackets 44 relative to the face of the riding ring 14. This dictates what through openings 52 in the mounting brackets 44 to use for attaching the mounting brackets 44 to the ends 40, 42 of the yoke 38.

The yoke 38 is removed from the face 32 of the carrier roll 12 and the mounting brackets 44 are secured to the ends 40, 42 of the yoke 38 in the most advantageous position as determined in the previous step. The gauge blocks 72 are brought against the main surface 54 of the yoke 38 and against the probes 63 of the measurement devices 50 to calibrate the measurement devices 50 to a zero-distance reference, as described earlier. The assembled and calibrated alignment tool 36 is then mounted onto a flat face 32 or 34 of the carrier roll 12 by means of the magnets 86, with the probes 63 of the measurement devices 50 facing toward, and in contact with, the adjacent flat face 28 or 30 of the riding ring 14, such that the measurement devices 50 are measuring a distance in a direction outwardly from and perpendicular to the plane defined by the planar main surface 54 of the yoke 38.

Note that, in this embodiment, the probes 63 of the measurement devices 50 project in a direction perpendicular to (that is, 90 degrees from) the plane defined by the planar main surface 54 of the yoke 38. Of course, it would be possible to take accurate readings and to complete the alignment procedure with the probes projecting at a different angle, if desired.

If the carrier roll 12 is misaligned relative to the riding ring 14, as depicted in FIG. 10, the two measurement devices 50 will read substantially different measurements. In this instance the top measurement device 50 (as seen from the vantage point of FIG. 10) may have a negative reading while the second measurement device 50 may have a positive reading. The absolute value of the difference between these two readings is an indication of the degree of misalignment between the carrier roll 12 and the riding ring 14.

To correct this misalignment, the bolts 74 (See FIG. 4) securing the frame 76 (on which the housing 78, the pillow block bearing 80, and the shaft 82 of the carrier roll 12 are mounted) are loosened. The bolts on the pusher blocks 84 are backed off, and then the bolt on one of the pusher blocks 84 is carefully threaded back in to bring the carrier roll 12 into the desired alignment with the riding ring 14.

As the bolt on the pusher block 84 is carefully threaded back in, the readings on the measurement devices 50 are monitored to ensure that the action is correcting the misalignment (the readings of the two measurement devices 50 should be coming closer together). If the degree of misalignment instead is becoming more severe, this indicates that the wrong pusher block 84 is being adjusted. The bolt on this pusher block 84 should then be backed-off and the bolt on the other pusher block 84 should be threaded in to bring the carrier roll 12 into the desired alignment with the riding ring 14.

Once the absolute value of the difference between the readings from the two measurement devices 50 is within the tolerance range desired or specified, the bolts 74 are tightened to secure the frame 76 in position on its foundation, which fixes the axis of rotation of that carrier roll 12. The alignment tool 36 then is removed from that carrier roll 12 and the measurement devices 50 are recalibrated to zero using the gauge blocks 72. The alignment tool 36 is then reinstalled onto the same face of the carrier roll 12, and readings are once again taken from the measurement devices 50 to confirm the previous measurements. The bolts on the pusher blocks 84 are then threaded in and tightened, and the alignment tool 36 is removed from the carrier roll 12, using the jacking screws 70 to assist in this task.

The same procedure is then repeated for each of the carrier rolls 12 until all of the carrier rolls 12 have been brought into specification, at which point the all the carrier rolls 12 will have been successfully aligned to their respective riding rings 14. It should be noted that the same alignment tool 36 and procedure may be used to align the pinion gear 22 to the ring gear 16.

The foregoing procedure is based on the assumption that the riding ring 14 is properly aligned with the vessel 10. It should be noted that, if it is known that the carrier rolls 12 are properly aligned with each other, and it is suspected that the riding ring 14 is not properly aligned with the vessel, then the alignment tool 36 can be used to bring the riding ring 14 into alignment with the carrier rolls 12, with the technician adjusting the brackets that hold the riding ring in position instead of adjusting the position of the carrier rolls 12. In this case, the vessel 10 would be rotated to various angular positions, and the riding ring 14 would be adjusted to be brought into alignment with the carrier rolls 12 at each angular position.

While the foregoing description describes one arrangement and method for aligning a carrier roll 12 to a riding ring 14, it will be obvious to those skilled in the art that modifications could be made to the arrangement and method without departing from the scope of the present invention as claimed.

What is claimed is:

1. An alignment tool for aligning a support roller with a riding ring of a rotary vessel, comprising:
    an elongated yoke having first and second ends and a front face, wherein said front face defines a substantially planar surface portion defining a first plane between said first and second ends;
    first and second distance measurement devices mounted on said first and second ends, respectively, each of said distance measurement devices including means for measuring distance in a direction outwardly from said first plane; and
    means for securing said yoke to a support roller having a flat roller face, with said planar surface portion of the yoke abutting the flat roller face.

2. An alignment tool as recited in claim 1, wherein said means for securing the yoke includes at least one magnet.

3. An alignment tool as recited in claim 2, wherein each of said distance measurement devices includes an outwardly-biased mechanical probe.

4. An alignment tool as recited in claim 2, wherein said magnet releasably secures said yoke to said flat roller face and further comprising at least one internally threaded through opening through said yoke and at least one jacking screw threaded into said internally threaded through opening for assisting in releasing the alignment tool from the flat roller face.

5. An alignment tool as recited in claim 4, wherein said magnet is mounted on said yoke and is recessed from the plane defined by the planar surface portion of the front face of the yoke.

6. An alignment tool as recited in claim 1, wherein said means for measuring distance in a direction outwardly from said first plane is in a direction which is perpendicular to said first plane.

7. An alignment tool as recited in claim 6, and further comprising mounting brackets mounted to said first and second ends of said yoke, said distance measurement devices mounted to said mounting brackets, wherein said mounting brackets include means for adjusting their position relative to said planar surface portion in said direction which is perpendicular to said first plane.

8. An alignment tool as recited in claim 7, and further comprising at least one calibration gauge block to set a zero distance reference for each of said distance measurement devices.

9. A method for aligning a support roller having a first axis of rotation with a riding ring of a rotary vessel having a second axis of rotation, comprising the steps of:
    mounting an elongated alignment device having first and second ends, and defining a substantially planar surface portion defining a first plane between said first and second ends, on the support roller;
    measuring a first distance from the planar surface portion at the first end of the alignment device to a flat face of the riding ring;
    measuring a second distance from the planar surface portion at the second end of the alignment device to said flat face of the riding ring;
    calculating an absolute value of the difference between said first distance and said second distance;
    determining whether said absolute value is within desired specifications; and
    if said absolute value is not within desired specifications, adjusting the position of the support roller until said absolute value is within desired specifications.

10. A method for aligning a support roller having a first axis of rotation with a riding ring of a rotary vessel having a second axis of rotation as recited in claim 9, and further comprising the steps of:
    mounting distance measurement devices, each having probe ends, at each of said first and second ends of said elongated alignment device; and calibrating each of said distance measurement devices to a zero distance reference corresponding to one fixed distance from said first plane to one of said probe ends before using said distance measurement devices for measuring from the first and second ends of the alignment device to a flat face of the riding ring.

* * * * *